Nov. 4, 1947.    F. L. MONCHER    2,430,237
WELD ANALYZER
Filed March 26, 1945    3 Sheets-Sheet 1
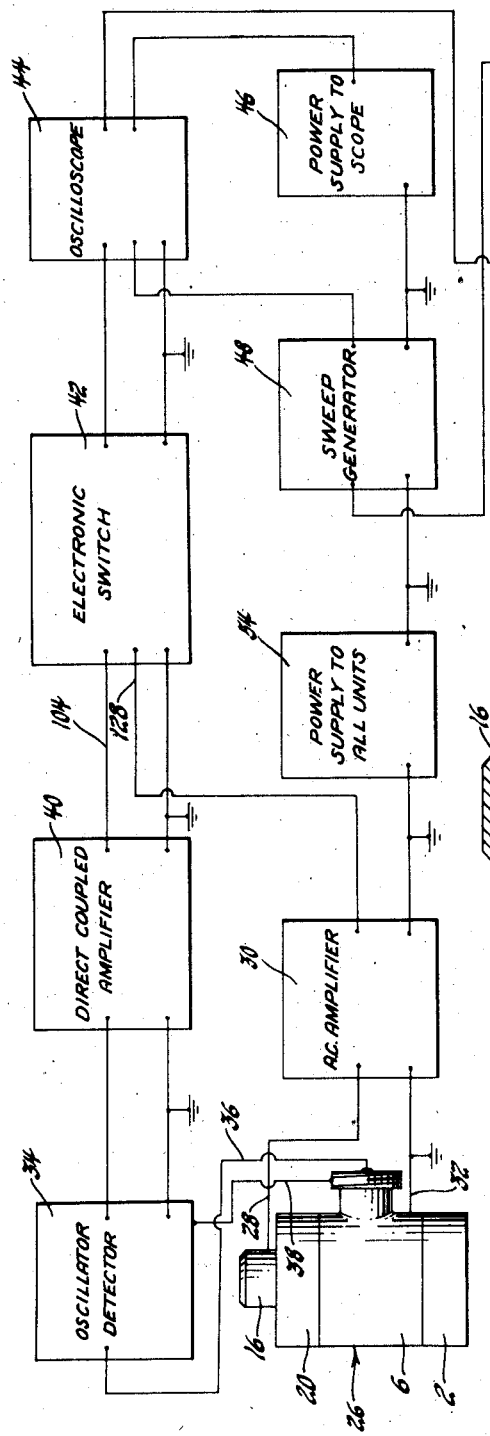
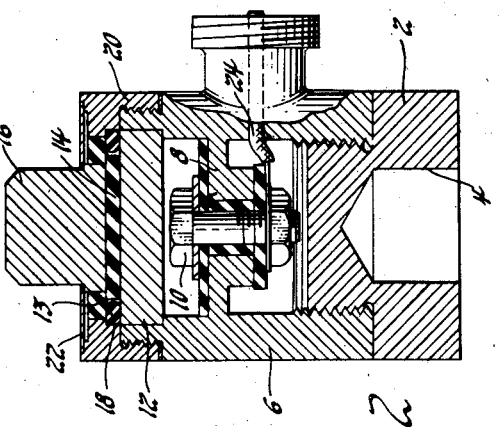
Inventor
Frank L. Moncher
By
Blackmor Spencer & Flint
Attorneys

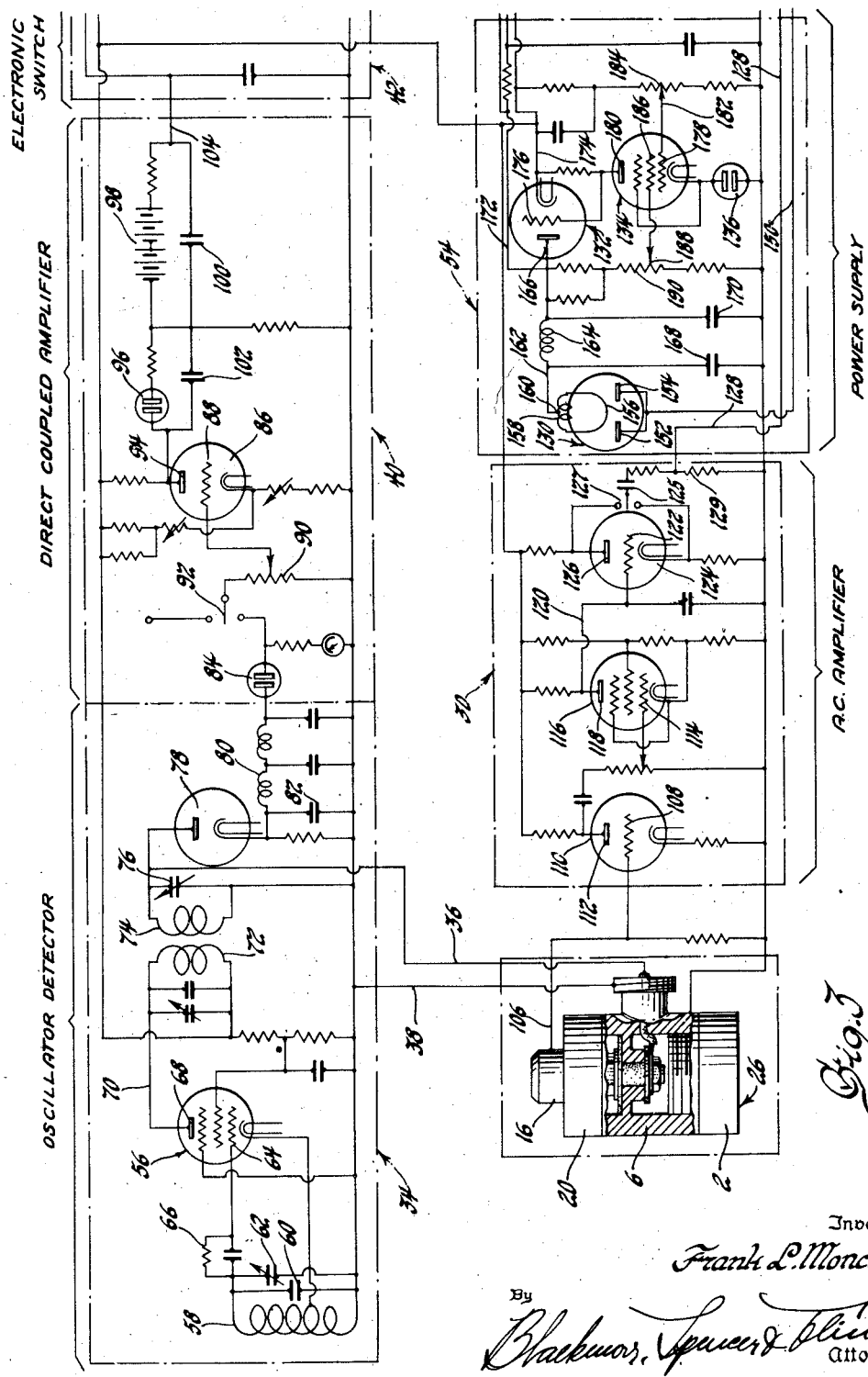

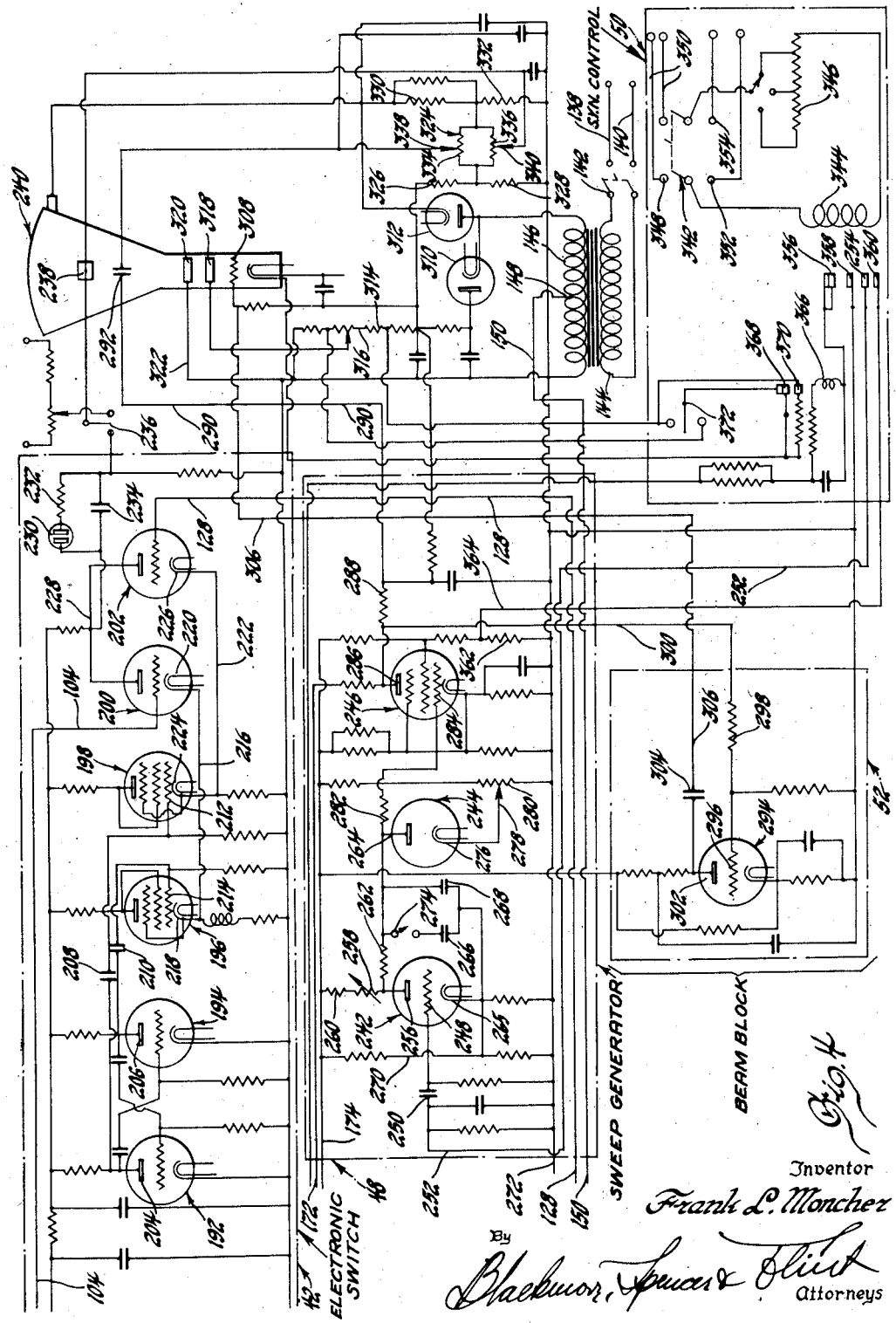

Patented Nov. 4, 1947

2,430,237

UNITED STATES PATENT OFFICE 2,430,237

WELD ANALYZER

Frank L. Moncher, Detroit, Mich., assignor to General Motors Corporation, Detroit, Mich., a corporation of Delaware Application March 26, 1945, Serial No. 584,988

17 Claims. (Cl. 219—4)

This invention relates to measuring and analyzing means and more particularly to measuring means for determining the instantaneous electrode pressure and welding current in a given welding machine under operating conditions. To facilitate the adjustment of a welding machine and to test the same through continued operation it is advisable to be able to determine electrode pressure and welding current at any time to see if the machine is operating correctly for materials being fed thereto, inasmuch as in some of the present light alloys close limits of both of the above variables have to be used to assure correct welds.

It is therefore an object of my invention to provide means for obtaining information regarding electrode pressure and welding current during a welding operation.

It is a still further object of my invention to provide analyzing means for reading instantaneous weld current throughout a welding operation.

It is a still further object of my invention to provide analyzing means for reading instantaneous electrode pressure throughout a welding operation.

It is a still further object of my invention to provide analyzing means for reading instantaneous values of electrode pressure and welding current simultaneously during a welding operation.

It is a still further object of my invention to provide a visual curve of both the welding current and electrode pressure for a welding operation.

It is a still further object of my invention to provide analyzing means as defined above which is portable and can be easily carried from place to place.

With these and other objects in view which will become apparent as the specification proceeds, my invention will be best understood by reference to the following specification and claims and the illustrations in the accompanying drawings, in which:

Figure 1 is a block diagram illustrating the various essential portions of my analyzing system.

Figure 2 is an enlarged vertical sectional view taken through the pressure and current pickup.

Figure 3 is a circuit diagram of a portion of my system; namely, the oscillator detector, direct coupled amplifier, A. C. amplifier and power supply as connected to the pickup, and Figure 4 is the remainder of the circuit diagram including the electronic switch, sweep generator, power supply, beam block, control and oscilloscope.

Referring now more particularly first to the pickup unit per se as shown in Figure 2, this comprises a lower metal base 2 having a central opening 4 therein which is adapted to fit over the lower electrode of the welding machine upon which it is desired to run a test. The upper end of the block 2 is reduced in diameter and exteriorly threaded to support a central metal cylindrical portion 6 of the unit. This central portion is hollow and has extending thereacross at one portion a plate 8 which insulatedly supports a contact 10 on its upper surface. Mounted in the upper end of the member 6 is a metallic or conductive disc or diaphragm 12 which carries on its upper surface an insulating pad 14 formed for example of a phenolic compound and a pressure plug 16 against which the upper electrode forces the work and which acts as the lower electrode to support the work. A rubber washer 18 surrounds the insulating member 14 and engages collar 20 which screws down on exterior threads on the upper end of the member 6 to hold the diaphragm 12 in place. This collar also supports a group of current carrying annular discs 22 which extend from the collar to the electrode 16 and are formed of manganin to form a low resistance in the current path being in the neighborhood of, for example, 5 micro-ohms. An annular ring of insulating material 13 otherwise separates the base of plug 16 from collar 20. The entire welding current passes through the discs 22 and the voltage drop thereacross gives an indication of the current flow and enables us to obtain a value thereof.

The pressure indication is obtained by variation in the capacity between electrode 10 and diaphragm 12. The deflection of the steel diaphragm 12 of the device used is, for example, one micro-inch per twenty pound load and this varies the total capacity between the diaphragm and stationary electrode 10 to provide an indication of the pressure. The electrode 10 is electrically connected by means of a conductor 24 to indicating apparatus and an electric connection is made to the contact block 16 whereby the voltage drop across the manganin discs 22 may be measured. With this unit, therefore, the operator can obtain an indication of instantaneous current and also electrode pressure. It is the final desire of the operator to apply these signals picked up by the unit just described to an oscilloscope and to create on the oscilloscope head waves or curves which can be read by the operator to define by two separate curves superimposed an instantaneous indication of the current curve and the electrode pressure curve for any given welding operation.

Referring now more specifically to the block diagram as shown in Figure 1, a general description of each of the units utilized will be given. The pickup unit as previously described in detail is shown generally at 26 with the conductive line 28 coming from the electrode 16 from which an indication of the value of the welding current is obtained which is connected to an A. C. amplifier 30. The outer casing or housing 6 of the pickup unit 26 is grounded through line 32 and also the input terminal of the A. C. amplifier is grounded through this same line. The condenser 12—10 is connected to an oscillator detector 34 through lines 36 and 38 and this condenser controls the oscillator output by off resonance tuning in proportion to the variation in capacity.

The oscillator detector output is connected to a direct coupled amplifier 40 which in turn feeds into an electronic switch 42 whose function briefly is to so switch back and forth between the output of the direct coupled amplifier 40 which provides a signal proportional to the electrode pressure and the A. C. amplifier 30 which provides a signal proportional to the welding current that both signals may be applied to the oscilloscope over different minute time intervals and both curves appear simultaneously on the cathode ray or oscilloscope head. The output of the electronic switch is, of course, connected directly into the oscilloscope 44. Power supply 46 supplies power to the oscilloscope and a sweep generator 48 which determines the horizontal sweep is controlled by a synchronizer 50 which is in turn energized by the welding control means (not shown). The function of a beam block 52 which is shown connected directly to the oscilloscope is to eliminate the return trace inasmuch as it would only confuse the configuration on the head of the tube and by this member the return trace can be entirely eliminated and only the primary transverse trace appears. A power supply 54 supplies power to the various units.

Thus, in general the operation would be as follows: the signal picked up across the voltage drop in the manganin sheets is proportional to the welding current flowing in the circuit and this drop is applied through A. C. amplifier 30 and thence to the electronic switch 42 which applies it to the oscilloscope in timed relation. At the same time the capacity across condenser 10—12 is fed to or connected with the oscillator detector 34 which through a circuit more specifically to be described, provides a proportional signal to the direct coupled amplifier 40 which again is fed to the electronic switch 40 and appears on the oscilloscope 44. The sweep generator 48 controls the initiation of the horizontal trace and this is in turn synchronized by an initiating control 50 which is itself controlled by the main control switch of the welding machine. The beam block, as previously explained, erases the return trace. Thus, we can view on the head of the oscilloscope simultaneously two traces, one proportional to the electrode pressure and the other proportional to the welding current and the operator can instantly determine the relation between these two variables at any point in the welding operation.

Referring now more specifically to Figures 3 and 4, which are in reality a single circuit diagram of the total system, there is in the lower left hand portion of Figure 3 the pickup unit, and, as above stated, the condenser 12—10 is connected through lines 36 and 38 to the oscillator detector which is shown in the upper left hand portion of Figure 3. The oscillator detector per se consists of an oscillator tube identified generally at 56 and controlled by a resonant circuit consisting of inductance 58 and capacities 60 and 62 which feed into the control grid 64 through a grid leak 66. The output of the oscillator is from plate 68 through line 70 to an air core transformer consisting of a primary 72 and a secondary 74 which is loosely coupled. The oscillator is set to oscillate at a predetermined frequency and the output circuit is slightly detuned so that the total output operates slightly off resonance or on the side of the resonance curve. Line 36 from the condenser 12—10 is connected to the output or secondary 74 and tends to vary the output on this side of the resonance curve and thus produces a comparatively straight line proportionality in the output.

It might be mentioned that the total capacity of this circuit is very limited, for example, 100 micro-micro-farads and therefore a short coaxial cable must be used for connection between the oscillator detector and the pickup unit. The pressure pickup therefore plus a small tuning condenser 76 also across the secondary 74 comprises the resonant circuit across which the signal and voltage variations appear. This modulated voltage is applied to a rectifier tube 78 and passed through a low pass filter consisting of choke coils 80 and capacitors 82 to remove the high frequency ripple. Therefore, the output of the oscillator detector is a D. C. voltage and in a particular apparatus constructed by applicant, this voltage varied from approximately 80 to 79.5 volts as an example of a proportionate voltage variation obtained when pressure was applied to the electrodes.

This voltage is applied to a gaseous tube 84, such for example, as a neon lamp which has a normal operating voltage drop to reduce the voltage a desired amount. The remainder of the voltage is then applied to tube 86 by being connected to the control grid 88 thereof through variable resistance 90 and switch 92. The output or plate 94 of the direct coupled amplifier is directly connected to a voltage regulator tube 96 which is in circuit with battery 98 and condensers 100 and 102, the output of this circuit being connected through line 104 to the electronic switch. This portion of the circuit provides a voltage reduction from the plate 94 of the tube 86 to a predetermined value for application to the grid of the control tube of the electronic switch.

Returning now to the current pickup a line 106 connected to the electrode 16 is also connected to the control grid 108 of the first tube 110 of the A. C. amplifier 30, the plate 112 of which is resistance coupled to the grid 114 of amplifier tube 116 where further amplification takes place. The plate 118 of tube 116 is connected through line 120 to control grid 122 of tube 124 which acts as a phase inverter, the output of the tube from the plate 126 is connected through switch 127, capacity 125, resistance 129 and line 128 to a second tube of the electronic switch. These two connections through lines 104 and 128 provide the two amplified signals proportional to the electrode pressure and welding current which are fed into the electronic switch.

There is provided a power supply section identified generally as 54 for operating the various amplifier and oscillator circuits. This particular power section includes a rectifier tube 130, a triode 132, a triple grid amplifier 134 and a voltage regulator gas filled tube 136. The main input lines 138 and 140 are provided for connection to a suitable commercial outlet of 110 v.–60 cycle current and are connected to a double pole single throw switch 142 which is in turn connected to the primary coil 144 of an input transformer. The secondary coil 146 of the transformer is provided with a center tap 148 which is connected by line 150 to both input electrodes 152 and 154 of rectifier tube 130. The output electrode 156 of the rectifier tube is connected across a small inductance 158 the center tap 160 of which is connected by line 162 to inductance 164, the opposite end of which is directly connected to plate 166 of tube 132. Two condensers 168 and 170 are connected between the opposite ends of the inductance and ground to form a low pass filter. Thus, there is developed between plate 166 and ground a certain desired voltage.

Tubes 132, 134 and 136 constitute the voltage regulator means which uses the variation in plate to cathode impedance in tube 132 to control the output voltage on line 174, which is the main voltage supply line. Line 172 is also a voltage supply line for certain portions of the circuit. For one particular construction, line 172 was supplied with 600 volts and line 174 with 400 volts which is regulated. This voltage regulation is accomplished as follows: the voltage on grid 176 of tube 132 is controlled by tube 134 and therefore the voltage drop across the tube 132 is affected by the same; the voltage on grid 178 of tube 134 is in turn proportional to the output voltage or voltage on line 174; gaseous tube 136 is provided to stabilize the operation of tube 134 and make the variation in output of the same only the result of line voltage variation and not from other sources. From the above it will be seen that as the voltage on line 174 tends to become smaller due to an increase in load on the line that the voltage of grid 178 will be reduced which will cause an increase in the voltage of plate 180. This will decrease the voltage on grid 176 and reduce the impedance on tube 132 which will increase the plate voltage to tend to restore the line voltage to its original value. If the voltage variation is of opposite sign the opposite effects to those described above will return the voltage to the set value. The desired voltage on line 174, which as mentioned above in one embodiment was 400 volts can be set by adjustment of the grid tap 182 on the bleeder 184 across the output. Grid 186 is also connected to an adjustable tap 188 on bleeder 190 in the input the function of which is to remove ripple voltage from the rectifier.

From the foregoing it will be evident that there is provided a stabilized power supply for the whole system and that the output from the direct coupled amplifier 40 representing the pressure signal and the output of A. C. amplifier 30 representing the current signal are both fed into the electronic timing switch 42 by lines 104 and 128 respectively. In order to apply two signals simultaneously to a single means for viewing the curves of the same, pulses whose value is proportional to the signals may be applied to the viewing means which in this case is the oscilloscope, such pulses being of such high frequency that as far as the observer is concerned they represent a solid trace on the cathode tube head. Since there are two curves which it is desired to obtain and study, alternate pulses from each source are provided by this switch to the control electrodes of the oscilloscope.

The electronic switch consists of three parts, a multivibrator section including tubes 192 and 194, a buffer section including tubes 196 and 198 and an amplifier section including alternately operating triode tubes 200 and 202. The multivibrator section operates at a relatively high frequency, for example 2500 cycles per second has been used. The tubes 192 and 194 are cross-connected and their plates 204 and 206 are capacitatively connected through condensers 208 and 210 to the control grids 212 and 214 of electronic tubes 196 and 198 respectively. Since the plate voltages 204 and 206 alternately become maximum at a predetermined frequency they will apply this voltage to the control electrodes 212 and 214 at this rate and therefore cause tubes 196 and 198 to alternately cut off or cease conducting at the frequency of the multivibrator section. Conductor 216 connects cathode 218 of tube 196 with cathode 220 of tube 200 and conductor 222 connects cathode 224 of tube 198 with cathode 226 of tube 202. When tube 196 is blocked out by high negative grid voltage then the associated triode 200 will operate as a normal amplifier and a signal proportional to the welding electrode pressure will be amplified and impressed upon the output line 228. At this time tube 198 will be conducting and its cathode voltage is high and since it is directly connected through line 222 with cathode 226 of tube 202, that tube will be blocked or non-conducting and the signal on its grid proportional to the welding current will not pass. However, in the next half cycle the conditions will be reversed and a signal proportional to the welding current will be impressed on line 228. Thus the plates of the two tubes 200 and 202 alternately impress a voltage on the common output line proportional to electrode pressure and welding current respectively switching from one to the other at the rate of 2500 cycles per second.

The output of the electronic switch section is impressed upon a regulator tube 230 in series with resistor 232 having a capacity 234 in parallel therewith and thence to switch 236 connected to one of the vertical deflection plates 238 of the oscilloscope cathode ray tube 240. Thus, when the switch 236 is closed the tracing on the tube head will appear as two separate traces, one providing the pressure curve and the other the current curve. This provides the vertical control currents for the oscilloscope.

In order to cause the cathode spot to move horizontally a sweep circuit or control must be provided which in this instance is shown generally at 48 and consists of a triode 242, a diode 244, and a pentode 246. The control grid 248 of the triode 242 is connected through resistance capacity coupling 250 to line 252 and thence to switch contact 254. This controls the voltage on the grid and therefore the conductive periods of tube 242. The plate 256 is connected through variable resistor 258 and resistor 260 to the main voltage supply line 174, and also through resistance 262 to one electrode 264 of a diode tube 244. A pair of condensers 266 and 268 are connected in parallel from the connector between resistor 262 and plate 264 and the cathode 265 which is tied to an intermediate point in a bleeder line 270 between the power line 174 and the ground line 272. A switch 274 is interposed in series with condenser 266 to isolate this from the circuit if desired. The electrode 276 of the diode 244 is connected to a variable tap 278 on bleeder resistor 280 to adjust the voltage on the diode. The electrode 264 is likewise connected through resistance 282 to control grid 284 of tube 246. The plate 286 of this tube is connected through resistor 288 and line 290 to one of the horizontal deflection plates 292.

The operation of the sweep control circuit will now be described. The condenser 268 is used to control the sawtooth oscillation for all normal uses. Condenser 266 that may be inserted in the circuit provides a different value and therefore a different sweep speed. Assuming that only condenser 268 is in circuit the voltage from the main supply line 174 will tend to charge the condenser. However, the tube 242 is connected across the condenser and is a tube of the "Thyratron" type, and the constants of the circuit are so chosen that the condenser may be charged up to a particular value, say for example 20 volts. The "Thyratron" tube is so biased that it will ionize at 20 volts by supplying the proper potential to the grid when the same is energized. A linear relation for voltage rise in the condenser is obtained by keeping the maximum condenser potential to a small percentage of the total supply voltage for example 20 volts from a 400 volt supply.

Therefore when the control circuit to grid 248 is closed and the potential on the condenser 268 climbs to 20 volts or any other predetermined value the tube 242 will conduct or fire and discharge the same until its potential has dropped a fixed amount, for example to 17 volts at which point the tube deionizes and the cycle repeats as long as the grid circuit is energized. It will be noted from the above that the voltage variation is relatively small being in the example given only 3 volts, and in order to increase the magnitude of this control voltage the amplifier tube 246 is provided which has an amplification factor of 100, so for the assumed values this would increase the voltage to a 300 volt swing. This voltage is connected to the horizontal deflecting plates to provide the sweep.

The diode 244 acts as a voltage limiter tube. By adjusting tap 278 the operator can set the condenser voltage from exceeding a certain value since the tube will conduct and prevent the voltage from going over the fixed value. It is thus possible to set the limiter so that the voltage across the condenser is not sufficient to cause the tube 242 to fire unless the grid potential of the latter receives a positive pulse. This limiter therefore blocks operation of the sweep circuit until a pulse which is timed to the operation of the welding machine is received on grid 248 to lower the firing potential and permit tube 242 to conduct.

The next general section of the complete system that will be described in detail is the beam block section identified as 52 on Figure 1 of the drawings. As mentioned previously in the specification it is desirable to eliminate or erase the return trace in order not to confuse the whole diagram or picture. The method used in the present construction is to impress a sufficiently high negative voltage on the grid of the oscilloscope during the return of the sweep trace so that the stream of electrons composing the beam are cut off. The physical portion of the circuit which accomplishes this is that associated with tube 294, the grid 296 of which is coupled through resistance 298 and line 300 with the plate 286 of tube 246 of the sweep circuit. The plate 302 of tube 294 is directly connected through a small condenser 304 and line 306 with the control grid 308 of the cathode ray tube. This amplifier tube 294 is so biased that only a sharp positive pulse will be amplified and placed on the grid of the oscilloscope tube. The gain is so adjusted that the return trace is eliminated without affecting the intensity or focus at any other position of the sweep.

Relatively high voltages are necessary for the operation of the oscilloscope tube and as an example of a tube which may be used there is utilized in the present instance an accelerator type tube requiring a total tube drop of 3000 volts and two supply lines are provided one at +1500 volts and the other at −1500 volts. This power is supplied at the proper potential through the two rectifier tubes 310 and 312. A sectional bleeder 314 is provided across the output of tube 310 which in this instance provides the −1500 volts and an adjustable tap 316 associated therewith is connected to electrode 318 which with electrode 320 fed by line 322 controls the focus and intensity of the tube. A positioning bleeder 324 formed of resistors 326, 328, 330, 332, 334 and 336 in H formation has two adjustable taps 338 and 340 connected to the vertical and horizontal deflection plates to centrally locate or set the rest at point of the beam.

In order to obtain proper synchronization of the linear time base of the oscilloscope with the operation of the welder, the sweep discharge is triggered by the welder timer. This is accomplished by a double-pole double-throw switch 342, the switch blades of which are connected in series with a relay coil 344 and an adjustable resistance 346. A first set of cooperating stationary contacts 348 are connected to feeder lines 350 which are adapted to be connected across the air solenoid of the welder. The opposite or alternate set of stationary switch contacts 352 are connected to lines 354 which are adapted to be connected across the current initiation circuit of the welder.

The relay coil 344 actuates two movable contacts 356 to complete circuits with their associated contacts 358 and 360 respectively. The closure of switch 254—360 completes a circuit from bleeder resistor 362 through line 364, switch contacts 360—254, line 252 to control grid 248 of tube 242. This applies a small potential to the grid and fires the tube 242 to initiate the sweep circuit thus causing it to start at the proper phased instant. The closing of switch 356—358 energizes relay coil 366 through an obvious circuit. This coil is associated with contacts 368 and 370 and when energized closes the switch formed thereby to automatically turn the beam on for the duration of the sweep trace. Manual switch 372 controls the sensitivity of this circuit.

There is therefore provided by the above system a compact device whereby the instantaneous values of electrode pressure and welding current present in a spot welder under normal operating conditions can be viewed and examined to keep the welds perfect where any slight variation might cause an unsatisfactory or weak weld to be made. The set up and operation of the device is as follows; the pickup unit 26 is first placed over the lower electrode and the oscillator detector unit 34 which is in a separate casing is placed near the welder, the two being connected by a relatively short cable; lines 138—140 are connected to commercial 110 volt 60 cycle power and through the power supply units 54 and 46 the proper voltage and current are supplied to the system; lines 350, usually provided with snap clamps, are connected across the pressure solenoid coil and, if desired, but usually not necessary in rapid shop check ups, the lines 354 can be connected across the current initiating switch of the welder. This places the device in readiness for operation assuming of course that the manual switches 92, 127, 236, 142, 342 and 372 are properly closed and the various adjustments and taps have been made. The welder switch is then closed and performs a weld upon material between the welding electrodes, the current and pressure curves appearing on the cathode tube head in synchronism with machine performance as the tube is triggered by the solenoid coil. If for any reason the operator desires to obtain a current curve only he has merely to throw switch 342 down to engage contacts 352 instead of 348 and open switch 92. Then only the current curve will appear on the screen and this will be synchronized with the current initiating means. Everything except the pickup unit and the oscillator detector may be located at any desired point but the pickup unit of course must be at the welder and the oscillator detector near the pickup. Readings can be obtained with my apparatus accurately and quickly to check for proper welding values.

I claim:

1. In indicating means for determining the different varying factors in the normal operation of a complex machine throughout its cycle of operation, means for translating operating factors into proportional electrical voltages, recording means connected to the translating means so that the voltages may be viewed and studied, and switching means between the translating and recording means to alternately apply proportionate voltages of the different factors to the recording means at sufficiently high speed that each appears to be a continuous record and the plurality may be compared at any instant.

2. In indicating means for determining the different varying factors in the normal operation of a complex machine throughout its cycle of operation, means for translating operating factors into proportional electrical voltages, a cathode ray oscilloscope connected to said translating means, and high frequency switching means connected between the oscilloscope and the translating means to alternately apply voltages proportional to the different factors to the oscilloscope at sufficiently high speed that each appears as a complete wave and the same may be compared at any instant.

3. In indicating means for determining operating characteristics of a welding machine having a timing controller during normal operation thereof, a pickup unit mounted on said welder and subject to the pressure thereof whose electrical characteristics are varied in proportion to the pressure, an oscilloscope having vertical and horizontal deflection means, oscillator detector means connected to the pickup whose output is varied in proportion to the variation in the electrical characteristic of the pickup, means connecting the output of the oscillator detector to the vertical deflection means of the oscilloscope and means connecting the horizontal deflection means to the timing controller.

4. In indicating means for determining operating characteristics of a welding machine having a timing controller during the normal operation of said machine, a pressure responsive variable capacity pickup unit mounted between the welding electrodes and subject to the pressure thereof and whose capacity varies proportionally with respect thereto, detecting and amplifying means connected to said pickup, an oscilloscope having horizontal and vertical deflecting plates, means connecting the vertical deflecting plates with the amplifying means and means connecting the horizontal plates with the timing controller so that a tracing of the pressure variation for a cycle may be obtained.

5. In indicating means for determining operating characteristics of a welding machine having a circuit controller during normal operation of the machine, a pickup unit mounted between the welding electrodes having a current shunt therein through which the welding current flows, an amplifier connected to the shunt, an oscilloscope having vertical and horizontal deflecting plates, means for connecting the amplifier output to the vertical deflection plates, and means to connect the horizontal deflection plates to the circuit controller for the welding machine to trigger the same upon initiation of welding current and obtain a trace of current variation in a cycle.

6. In indicating means for determining operating characteristics of a welding machine having a circuit controller during the normal operation of the machine, a pickup unit mounted between the welding electrodes and subject to the welding current and pressure including means whose electrical value changes dependent upon a change in the current or pressure respectively, separate amplifying means connected to the current and pressure means, an oscilloscope and high speed switching means connected to both amplifiers and to the oscilloscope for alternately applying the proportional outputs thereto.

7. In indicating means for determining operating characteristics of a welding machine having a controller during the normal operation of the machine, a pickup unit mounted between the welding electrodes comprising a condenser whose capacity will be varied in proportion to the pressure on the unit, a current shunt in the unit, oscilloscope means having vertical and horizontal deflection means, separate conductive paths from the condenser and shunt to the vertical deflection means of the oscilloscope, switching means common to both paths to alternately apply voltage proportional to the pressure and the current to said vertical deflection means and conductive means interconnecting the horizontal deflection means and the controller means to trigger the sweep and synchronize the operation.

8. In indicating means for determining operating characteristics of a welding machine having a controller during the normal operation of the machine, a pickup unit mounted between the welding electrodes comprising a condenser whose capacity will be varied in proportion to the pressure on the unit, a current shunt in the unit, oscilloscope means having vertical and horizontal deflection means, oscillator detector means connected to the condenser, amplifier means connected to the output of the oscillator detector, a second amplifier connected to the current shunt to amplify the voltage drop across the same, electronic switching means connected to the outputs of both amplifiers and to the vertical deflection means of the oscilloscope to alternately apply voltages to said deflection means proportional to the welding electrode pressure or the welding current.

9. In indicating means for determining operating characteristics of a welding machine having a controller during the normal operation of the machine, a pickup mounted between the welding electrodes comprising a condenser whose capacity will be varied in proportion to the pressure on the unit, a current shunt in the unit, oscilloscope means having vertical and horizontal deflection means, oscillator detector means connected to the condenser, amplifier means connected to the output of the oscillator detector, a second amplifier connected to the current shunt to amplify the voltage drop across the same, high frequency electronic switching means including a pair of alternately firing tubes, means connecting the output of the amplifiers independently to the tubes so that each amplifier controls one tube and means for connecting the output of the switching means to the vertical deflection means of the oscilloscope.

10. In indicating means for determining operating characteristics of a welding machine having a controller during the normal operation of the machine, a pickup unit mounted between the welding electrodes comprising a condenser whose capacity will be varied in proportion to the pressure on the unit, a current shunt in the unit, oscilloscope means having vertical and horizontal deflection means, oscillator detector means connected to the condenser, amplifier means connected to the output of the oscillator detector, a second amplifier connected to the current shunt to amplify the voltage drop across the same, electronic switching means connected to the outputs of both amplifiers and to the vertical deflection means of the oscilloscope to alternately apply voltages to said deflection means proportional to the welding electrode pressure or the welding current, oscillator means connected to the horizontal deflection means of the oscilloscope to provide a sweep control and conductive means connecting the oscillator to the welding controller to synchronize the sweep circuit.

11. In indicating means for determining operating characteristics of a welding machine, a pickup unit applicable between the electrodes of the welding machine during its working cycle and subject to electrode pressure and current, said unit comprising an outer conductive hollow casing having a depression in the lower surface to fit over the lower welding electrode, a stationary capacitor plate insulatedly mounted within the casing, a relatively heavy plate diaphragm mounted in the top of the casing in spaced relation to the stationary capacitor and forming therewith a condenser whose variation is proportional to welding pressure, a conductive block insulatedly supported on the diaphragm and acting as a substitute lower electrode for the welder when the unit is in place, a ring of low resistance material interconnecting the casing and the block to act as current path and means to secure the block and ring to the casing.

12. In indicating means for determining operating characteristics of a welding machine having electrodes, a pickup unit comprising a casing applicable between the electrodes of the machine during normal operation, variable condenser means carried by the casing adjustable due to electrode pressure and proportional to the same, current shunt means also carried by the casing for conducting the welding current so that the variation in capacity of the condenser and the variation in the voltage drop across the current shunt provide proportionate indications of the electrode pressure and welding current respectively.

13. In indicating means for determining operating characteristics of a welding machine having a controller during normal operation of the machine, portable means applicable to the welder subject to the welder pressure and current and in which voltages proportionate to the pressure and current are developed, oscilloscope means having a plurality of control electrodes, means for connecting said developed voltages to one set of control electrodes of the oscilloscope, means connecting the controller to another set of control electrodes to synchronize the oscilloscope to the welder operation and provide tuned curves of the welding pressure and current.

14. In indicating means for determining operating characteristics of a welding machine having a controller during normal operation of the machine, portable means applicable to the welder subject to the welder pressure and current and in which voltages proportionate to the pressure and current are developed, oscilloscope means having a plurality of control electrodes, means for connecting said developed voltages to one set of control electrodes of the oscilloscope, means connecting the controller to another set of control electrodes to synchronize the oscilloscope to the welder operation and provide tuned curves of the welding pressure and current and synchronized potential supply means connected to a further electrode of the oscilloscope to extinguish the oscilloscope over a certain portion of the cycle to eliminate the return trace and prevent confusion of the curves appearing on the oscilloscope.

15. In indicating means for determining operating characteristics of a welding machine having a tuned controller during normal operation of the machine, pickup means applicable to the welder and subject to the welding pressure and current, capacity means in the pickup means whose quantitative value is proportional to the pressure on the pickup means, a current shunt carried by the pickup means through which the welding current flows and across which the voltage drop is proportional to the current flow, oscillator detector means, means connecting the pickup capacity means into the output of the oscillator detector to detune the same and vary the output, amplifying means connected to said output, a second amplifying means connected to the current shunt, high frequency electronic switching means including a pair of alternately firing tubes, means connecting the outputs of the two amplifiers to control the flow through these two tubes, a cathode ray oscilloscope and means connecting the oscilloscope to the output of the tubes so that both signals may be simultaneously indicated and compared.

16. In indicating means for determining operating characteristics of a welding machine having a tuned controller during normal operation of the machine, pickup means applicable to the welder and subject to the welding pressure and current, capacity means in the pickup means whose quantitative value is proportional to the pressure on the pickup means, a current shunt carried by the pickup means through which the welding current flows and across which the voltage drop is proportional to the current flow, oscillator detector means, means connecting the pickup capacity means into the output of the oscillator detector to detune the same and vary the output, amplifying means connected to said output, a second amplifying means connected to the current shunt, high frequency electronic switching means including a pair of alternately firing tubes, means connecting the outputs of the two amplifiers to control the flow through these two tubes, a cathode ray oscilloscope having vertical and horizontal deflecting plates, means connecting the output of the tubes to the vertical deflecting plates, a sweep oscillator, means interconnecting the welder controller and the sweep oscillator to fire the same and means to connect the output of the sweep oscillator to the horizontal deflection plates so that a composite trace is produced on the oscilloscope locked to the energization means of the welding machine.

17. In indicating means for determining operating characteristics of a welding machine having a tuned controller during normal operation of the machine, pickup means applicable to the welder and subject to the welding pressure and current, capacity means in the pickup means whose quantitative value is proportional to the pressure on the pickup means, a current shunt carried by the pickup means through which the welding current flows and across which the voltage drop is proportional to the current flow, oscillator detector means, means connecting the pickup capacity means into the output of the oscillator detector to detune the same and vary the output, amplifying means connected to said output, a second amplifying means connected to the current shunt, high frequency electronic switching means including a pair of alternately firing tubes, means connecting the outputs of the two amplifiers to control the flow through these two tubes, a cathode ray oscilloscope having vertical and horizontal deflecting plates, means connecting the output of the tubes to the vertical deflecting plates, a sweep oscillator, means interconnecting the welder controller and the sweep oscillator to fire the same and means to connect the output of the sweep oscillator to the horizontal deflection plates so that a composite trace is produced on the oscilloscope locked to the energization means of the welding machine, a control electrode in said oscilloscope, potential supply means for the electrode, a control tube in said supply means and means for controlling the energized periods of said tube connected to the output of the sweep oscillator to erase the trace at certain predetermined periods.

FRANK L. MONCHER.

REFERENCES CITED

The following references are of record in the file of this patent:

UNITED STATES PATENTS

| Number | Name | Date |
| --- | --- | --- |
| 2,132,267 | Lord | Oct. 4, 1938 |
| 2,149,558 | Stansbury | Mar. 7, 1939 |
| 2,322,052 | Ogden | June 15, 1943 |
| 2,158,640 | Strange | May 19, 1939 |